3,039,999
HYPOPHOSPHITE COLOR-FORMING INHIBITOR IN POLYESTER CONDENSATION
Robert G. Linville, Summit, Robert J. Osborne, Scotch Plains, and Charles L. Smart, Millington, N.J., assignors to Celanese Corporation of America, New York, N.Y., a corporation of Delaware
No Drawing. Filed Apr. 15, 1958, Ser. No. 728,530
15 Claims. (Cl. 260—75)

The present invention relates to improvements in the production of linear polyesters and more particularly to catalytic processes for producing linear polyesters through condensation of an ester of a dicarboxylic acid and a glycol.

In one process for preparing filament- or film-forming linear polyesters such as polyethylene terephthalate, a monomeric ester of a dicarboxylic acid and a hydroxy compound (e.g. an alcohol or phenol) such as dimethyl terephthalate is reacted with a glycol such as ethylene glycol to effect ester interchange, thereby forming a hydroxy ester such as bis-2-hydroxyethyl terephthalate and splitting off methanol or other hydroxy compound. After this the temperature is raised to effect condensation to a linear polyester with liberation of the glycol. The reaction mixture, at least in the later stages, has a high melting point (e.g. above about 225° C. and, in the case of the glycol terephthalate, above about 255° C.) and it is necessary to use high temperatures e.g. about 255–290° C. to keep the mixture in the liquid condition. To permit the reactions to proceed within a reasonable time interval it has been proposed to add catalysts. Use of many of the catalysts suggested has resulted in products which, while of high molecular weight, are poor in color. Others give products whose color is good but whose molecular weight is too low for commercial use as fiber-forming materials.

It is an object of the present invention to provide an improved catalytic process for the preparation of polyesters.

Other objects of the invention will become apparent from the detailed description of the invention which follows, wherein all parts and percentages are by weight unless otherwise expressed.

In accordance with one aspect of the invention is has been found that by the addition of a hypophosphite salt to a polyesterification reaction mixture containing a zinc, lithium, magnesium or manganese compound as a catalyst it is possible to produce rapidly polyesters of better color than are obtainable in the absence of the hypophosphite salt.

The zinc, lithium, magnesium or manganese compounds employed in the reaction mixture may be those previously suggested as catalysts for either the ester interchange or the polycondensation reaction or both. Thus, excellent results have been obtained by the use of the hypophosphite salt in combination with zinc chloride, zinc carbonate, lithium acetate, magnesium acetate or manganous acetate, or with a mixture of lithium carbonate (a good esterification and polycondensation catalyst, but one which yields yellow products) and zinc oxide (a catalyst for the polycondensation).

The conditions of the polyester-forming reaction are conventional whether starting from the dimethyl terephthalate or from the intermediate bis-2-hydroxyethyl terephthalate. Specifically, in the ester interchange reaction of dimethyl terephthalate with ethylene glycol, the glycol is present ordinarily in at least molar proportions, preferably in the neighborhood of twice the molar proportion of the dimethyl terephthalate, although more or less glycol may be used. The materials are heated, preferably in an inert atmosphere, to a temperature at least sufficient to boil off the by-product methanol at the prevailing pressure. While the pressure may be sub-atmospheric or super-atmospheric, atmospheric pressure is adequate since the reaction proceeds at reasonable speed at moderate temperature, e.g. 140°–230° C. although higher or lower temperatures may be employed. The by-product methanol is preferably removed as formed and the amount of methanol taken off is a measure of the extent to which the ester interchange has proceeded.

The product of the ester interchange reaction, which is generally bis-2-hydroxyethyl terephthalate mixed with low polymers, is then heated further, preferably in an inert atmosphere, to a temperature at which it will condense with liberation of ethylene glycol. The temperature is increased, preferably gradually, during this stage, e.g. to about 260 to 90° C., preferably to about 270 to 285° C. Vacuum is applied at least during the latter stages of the condensation to facilitate removal of by-product ethylene glycol.

The hypophosphite salt may be added when the condensation is to be effected. The zinc, lithium, magnesium or manganese compound may be added at that stage or may already be present, having been added during or prior to, formation of the bis-2-hydroxyethyl terephthalate and low polyesters through ester interchange. Preferably, both the hypophosphite salt and the zinc, lithium or manganese compound are present during the ester interchange and are carried through to the condensation stage. The hypophosphite salt and the zinc, lithium, magnesium or manganese compound may be added separately or they may be combined before they are added to the reactants.

A very suitable catalyst system to which the hypophosphite salt may be added is a combination of the zinc, lithium, magnesium or manganese compound with an organophosphine. The organophosphine may be added when the polycondensation is to be effected. The metal compound may be added at that stage or may already be present, having been added during or prior to, formation of the bis-2-hydroxyethyl terephthalate and low polyesters through ester interchange. Preferably, both the organophosphine and the metal compound are present during the ester interchange and are carried through to the condensation stage. The metal compound and the organophosphine may be added separately or they may be combined before they are added to the reactants.

Suitable organophosphines which may be used in the practice of the present invention include aryl phosphines, alkyl phosphines, alkaryl phosphines, aralkyl phosphines and derivatives thereof having inert substituents such as alkoxy radicals. Best results are achieved when the organophosphine is a (poly-organo)-phosphine, i.e. a secondary or tertiary phosphine wherein the phosphorus atom is attached directly to two or three organic radicals, preferably to three organic radicals. Representative organophosphines include triphenyl phosphine, tri-biphenyl phosphine, tri-butyl phosphine, phenyldibutylphosphine, 4-phenoxyphenyldibutylphosphine, methyldiphenylphosphine, 4-methylphenyldiphenylphosphine, diphenylphosphine, and the like.

Suitable hypophosphite salts which may be used in the practice of the present invention include the magnesium, calcium, manganous and potassium hypophosphites. The proportion of hypophosphite salt may be, for example, in the range of about 0.005 to 2%, based on the weight of the final polyester. The proportion of zinc, lithium, magnesium or manganese compound may be, for instance, in the range of about 0.005 to 0.5%, preferably 0.01 to 0.1% based on the weight of the final polyester; in the preferred form, in which dimethyl terephthalate is used in the production of polyethylene terephthalate, the weight of dimethyl terephthalate used is very close to that of the final polyester and, for convenience, these same ranges may be based on the weight of the dimethyl terephthalate.

When an organophosphine is used, it is preferred that both the organophosphine and the metal compound (i.e. the zinc, lithium, magnesium or manganese compound) be dissolved (either as such or by reaction) in the reaction mixture. It is desirable to have present at least ½ atom, preferably about 1 to 3 atoms, of phosphorous (from the organophosphine) per atom of metal (from the metal compound); an excess of the organophosphine may be employed, such as proportions of 5 and even 30 atoms of phosphorus (from the organophosphine) per atom of metal (from the metal compound).

It is believed that in many cases the unexpected synergistic effects obtained by the use of the metal compound in combination with the organophosphine may be explained by the formation of a complex between these materials, which complex is more active catalytically than the individual components.

The reaction mass either for ester interchange or condensation, in addition to the reactants and catalyst, may contain additional catalysts, promoters, stabilizers (such as triphenyl phosphite), adjuvants or the like, to improve the product or to be carried along into the product for special effects.

While the invention has been described with particular reference to the production of polyethylene terephthalate, in which it finds its greatest utility, it may be used also in the manufacture of high linear polyesters (including polyether esters) derived from other glycols, and/or from other dicarboxylic acids, especially aromatic dicarboxylic acids with their carboxyl groups linked to the aromatic nucleus or nuclei in diametrically opposite positions. Examples of such other dicarboxylic acids and glycols include certain substituted terephthalic acids, diphenyl-4,4'-dicarboxylic acid α,β-diphenylethane-4,4'-dicarboxylic acid, α,δ-diphenylbutane-4,4'-dicarboxylic acid and other α,ω-diphenylalkane-4,4'-dicarboxylic acids, α,β-diphenoxyethane-4,4'-dicarboxylic acid, α,δ-diphenoxybutane-4,4'-dicarboxylic acid, and other α,ω-diphenoxyalkane-4,4'-dicarboxylic acids; and trimethylene and propylene glycols.

The following examples are given to illustrate the invention further. In these examples, the "inherent viscosity" is equal to $$\frac{\ln \eta r}{c}$$

where $\eta r$ is the relative viscosity (i.e. the solution/solvent viscosity ratio) and $c$ is the concentration in grams per 100 ml. of solution, the inherent viscosity in each case being measured for a solution, of concentration 0.1 g./100 ml., in a 10/7 mixture of phenol/2,4,6-trichlorophenol at 25° C. The "crystalline melting point," as used herein, is measured, in conventional manner, by observing the temperature at which the birefringence of a previously fused and solidified sample disappears. In all the examples, the reactions are carried out under an atmosphere of prepurified nitrogen (after initial purification of the reaction mixture under vacuum to removed occluded or dissolved gases); however, when the stage of condensation is reached where the pressure is reduced below about 5 mm. Hg absolute the nitrogen supply is, for convenience, cut off but is resumed when the pressure is allowed to rise at the conclusion of the process. The pressure is atmospheric unless otherwise specified.

*Example I*

100 parts of dimethyl terephthalate and 67 parts ethylene glycol are melted together with 0.04 part zinc chloride and 0.05 part magnesium hypophosphite hexahydrate. The temperature is raised to 180–200° C. and held for 3½ hours. After this time methanol evolution has ceased and the temperature was raised to 280° C. in 1½ hours. The pressure is then reduced gradually to less than 4 mm. Hg. After 3½ hours a viscous melt is obtained. The polymer on cooling has excellent color. Its inherent viscosity is 0.61 and its crystalline melting point is 259° C. Strong fibers of excellent color can be obtained from the melt. Use of the zinc chloride alone leads to colored polymers.

*Example II*

Example I is repeated using 0.1 part of zinc carbonate in place of the zinc chloride; 0.05 part of calcium hypophosphite in place of the magnesium hypophosphite; 2½ hours instead of 3½ hours for the ester-interchange; and 4½ hours instead of 3½ hours for the polycondensation at reduced pressure. A strong product of excellent color is obtained. Use of the zinc carbonate alone leads to colored polymers.

*Example III*

100 parts of dimethylterephthalate, 67 parts of ethylene glycol, 0.2 part of zinc oxide, 0.05 part lithium carbonate and 0.05 part magnesium hypophosphite hexahydrate are melted together. The temperature is raised to 180–200° C. After four hours methanol evolution has ceased and the temperature is raised to 275–280° C. and held for approximately 0.5 hour, at atmospheric pressure. Polycondensation is then carried out at a pressure of about 4 mm. of mercury absolute for 3.7 hours. The product on cooling is white with a tingle of cream. Its inherent viscosity is 0.57 and fibers with excellent tensile properties can be obtained from the melt. The solid shows a crystalline melting point of 261° C.

*Example IV*

25 parts dimethyl terephthalate, 16 parts ethylene glycol, 0.02 part lithium acetate dihydrate and 0.02 part magnesium hypophosphite hexahydrate are heated to 185° C. for 3 hours for the ester interchange reaction. The temperature is raised to 275° C. for 1 hour at atmospheric pressure and the pressure slowly (over about ½ hour) reduced to less than 2 mm. Hg absolute. The polycondensation is carried out at 285° C. for 2 more hours. A very viscous polymer is obtained having an inherent viscosity greater than 0.5 and excellent color.

*Example V*

196 parts dimethyl terephthalate, 130 parts ethylene glycol, 0.11 part lithium acetate dihydrate and 0.145 part magnesium hypophosphite hexahydrate are heated at 190° C. for 2 hours for the ester interchange reaction. The temperature is raised to 275° C. for 1 hour, at atmospheric pressure, and the pressure is then reduced to less than 2 mm. Hg absolute over a thirty minute period. The polycondensation is carried out over a period of 2½ more hours at 290° C. to yield a viscous, colorless melt. The polymer, of inherent viscosity greater than 0.5 is very white.

*Example VI*

Twenty-five parts of dimethyl terephthalate, 16 parts of ethylene glycol, 0.025 part magnesium acetate tetrahydrate and 0.025 part magnesium hypophosphite hexahydrate are heated at 180° C. for 2 hours for the removal of methanol. The temperature is raised to 175° C. for 1 hour at atmospheric pressure, and the pressure reduced to less than 2 mm. Hg absolute over a thirty-minute period. The polycondensation is carried out for 3½ more hours at 275° C. to yield a white polymer having an inherent viscosity above 0.5.

*Example VII*

Twenty-five parts of dimethyl terephthalate, 16 parts of ethylene glycol, 0.025 part manganous acetate tetrahydrate and 0.025 part manganese hypophosphite monohydrate are heated to 180° C. for 2 hours for ester interchange and the temperature raised to 275° C. for 1 hour, at atmospheric pressure. The pressure is then reduced to less than 2 mm. Hg absolute over a period of 30 minutes.

The polycondensation step is carried out for 4 more hours at 275° C. The polymer has an inherent viscosity in the range of about 0.5 and has a very light pink color from the manganese ion.

*Example VIII*

To 1000 parts dimethyl terephthalate, 650 parts ethylene glycol, 0.5 part zinc acetate dihydrate, 0.6 part triphenylphosphine there are added 0.25 part magnesium hypophosphite hexahydrate and the mixture is heated for 2 hours, the temperature rising from 180° C. to 220° C. During this time about 85% of the theoretical amount of methanol is removed. In 2.5 additional hours of heating at atmospheric pressure, a temperature of 285° C. is reached. The pressure is reduced over 30 minutes to 4 mm. Hg absolute. After 7.5 hours under this reduced pressure and at a temperature of 280° C. a dead white product of inherent viscosity 0.6 is produced. While the presence of the magnesium hypophosphite slows down the reaction rate somewhat, as compared with a control made in the same manner without the hypophosphite, the color is considerably improved. Also, the product of this example shows a much smaller loss in melt viscosity which takes place when it is kept molten for extended periods of time (e.g. 5 hours in a nitrogen atmosphere) as compared with the loss in melt viscosity in the case of the control.

It is to be understood that the foregoing detailed description is given merely by way of illustration and that many variations may be made therein without departing from the spirit of our invention.

Having described our invention, what we desire to secure by Letters Patent is:

1. In the process for the production of linear fiber forming high polyesters by the condensation in liquid condition of a bis-glycol ester of terephthalic acid and ethylene glycol in the presence of about 0.005 to about 0.5 wt. percent of a catalyst comprising a compound from the group consisting of zinc chloride, zinc carbonate, lithium acetate, magnesium acetate, manganese acetate, lithium carbonate and zinc oxide, the improvement which comprises effecting the condensation in the presence of about 0.005 to about 2 wt. percent of a metal hypophosphite salt.

2. Process as set forth in claim 1 in which the hypophosphite salt is magnesium hypophosphite.

3. Process as set forth in claim 1 in which the hypophosphite salt is calcium hypophosphite.

4. Process as set forth in claim 1 in which the hypophosphite salt is potassium hypophosphite.

5. Process as set forth in claim 1 in which the hypophosphite salt is manganous hypophosphite.

6. Process as set forth in claim 1 in which the catalyst comprises zinc chloride.

7. Process as set forth in claim 1 in which the catalyst comprises zinc oxide.

8. Process as set forth in claim 1 in which the catalyst comprises lithium acetate.

9. Process as set forth in claim 1 in which the catalyst comprises magnesium acetate.

10. Process as set forth in claim 1 in which the catalyst comprises manganous acetate.

11. Process as set forth in claim 1 in which the catalyst comprises also a tertiary organophosphine.

12. Process as set forth in claim 1 in which the catalyst comprises zinc acetate and triphenyl phosphine.

13. In the production of linear fiber forming high polyesters by a process comprising the steps of effecting ester-interchange between dimethyl terephthalate and ethylene glycol, with splitting off of methanol, followed by polycondensation of the product of the ester-interchange reaction at a temperature between about 255° C. and about 290° C. to produce said high polyester in the presence of about 0.005 to about 0.5 wt. percent of a catalyst comprising a compound selected from the group consisting of zinc chloride, zinc carbonate, lithium acetate, magnesium acetate, manganese acetate, lithium carbonate and zinc oxide, the improvement which comprises effecting said process in the presence of about 0.005 to about 2 wt. percent of a metal hypophosphite salt.

14. In the production of linear fiber forming high polyesters by a process comprising the steps of effecting ester-interchange between dimethyl terephthalate and ethylene glycol, with splitting off of methanol, followed by polycondensation of the product of the ester-interchange reaction at a temperature between about 255° C. and about 290° C. to produce said high polyester in the presence of about 0.005 to about 0.5 wt. percent of a catalyst comprising a compound selected from the group consisting of zinc chloride, zinc carbonate, lithium acetate, magnesium acetate, manganese acetate, lithium carbonate and zinc oxide, the improvement which comprises effecting the entire polycondensation in the presence of about 0.005 to about 2 wt. percent of a metal hypophosphite salt.

15. In the process for the production of linear fiber forming high polyesters by the condensation of a bis-glycol ester of an aromatic dicarboxylic acid with its carboxyl groups linked to the aromatic nucleus in diametrically opposed positions and a glycol having 2 to 3 carbon atoms in the presence of about 0.005 to about 0.5 wt. percent of a catalyst comprising a compound from the group consisting of zinc chloride, zinc carbonate, lithium acetate, magnesium acetate, manganese acetate, lithium carbonate and zinc oxide at a temperature above 255° C., the improvement which comprises effecting the condensation in the presence of about 0.005 to about 2 wt. percent of a metal hypophosphite salt.

References Cited in the file of this patent

UNITED STATES PATENTS

| | | |
|---|---|---|
| 2,437,046 | Rothrock et al. | Mar. 2, 1948 |
| 2,437,232 | Rothrock et al. | Mar. 2, 1948 |
| 2,681,360 | Vodonik | June 15, 1954 |

FOREIGN PATENTS

| | | |
|---|---|---|
| 588,833 | Great Britain | June 4, 1947 |